US008517649B2

(12) United States Patent
Pratt

(10) Patent No.: US 8,517,649 B2
(45) Date of Patent: *Aug. 27, 2013

(54) DUAL-ACTION DISPOSABLE CLAMP

(75) Inventor: John D. Pratt, Laguna Nigel, CA (US)

(73) Assignee: Monogram Aerospace Fasteners, Inc., Los Angeles, CA (US)

( * ) Notice: Subject to any disclaimer, the term of this patent is extended or adjusted under 35 U.S.C. 154(b) by 533 days.

This patent is subject to a terminal disclaimer.

(21) Appl. No.: 12/098,857

(22) Filed: Apr. 7, 2008

(65) Prior Publication Data

US 2009/0092462 A1 Apr. 9, 2009

Related U.S. Application Data

(63) Continuation-in-part of application No. 11/973,278, filed on Oct. 5, 2007.

(60) Provisional application No. 60/849,515, filed on Oct. 5, 2006, provisional application No. 60/857,700, filed on Nov. 8, 2006, provisional application No. 60/901,171, filed on Feb. 13, 2007.

(51) Int. Cl.
F16B 13/06 (2006.01)

(52) U.S. Cl.
USPC .................................. 411/34; 411/39; 411/43

(58) Field of Classification Search
USPC .................. 411/34, 38, 39, 42, 43, 55, 5, 1–4
See application file for complete search history.

(56) References Cited

U.S. PATENT DOCUMENTS

| 612,316 A | 10/1898 | Downes |
| 748,078 A | 12/1903 | Kaisling |
| 2,282,711 A | 5/1942 | Eklund |
| 2,409,352 A | 10/1946 | Gill |
| 2,763,314 A | 9/1956 | Gill |
| 2,863,351 A | 12/1958 | Vaughn |
| 2,915,934 A | 12/1959 | La Torre |
| 2,971,425 A | 2/1961 | Blakeley |

(Continued)

FOREIGN PATENT DOCUMENTS

| DE | 20 2006 012 668 | 11/2006 |
| EP | 1889688 | 2/2008 |
| WO | WO 01/04499 A2 | 1/2001 |
| WO | WO 2008/045360 A2 | 4/2008 |

OTHER PUBLICATIONS

International Search Report from PCT/US2009/039083.
International Search Report from PCT/US2008/080114.

(Continued)

Primary Examiner — Flemming Saether
(74) Attorney, Agent, or Firm — Woodard, Emhardt, Moriarty, McNett & Henry LLP

(57) ABSTRACT

Disclosed are several clamps and a method for installing the clamps through at least two work pieces from one side. The clamps include a shank, a spacer, a core bolt and an expander. The shank and expander are keyed to together with the expander engaged on the core bolt such that rotation of the core bolt can bulb the expander to form a clamp surface on the blind side of the work pieces. The shank and spacer are temporarily held apart until the expander is bulbed wherein the shank is allowed to enter the spacer to clamp the work pieces. Subsequent over torque of the core bolts fractures a weakened portion of the core bolt permitting removal of the clamps when desired.

28 Claims, 17 Drawing Sheets

(56) References Cited

U.S. PATENT DOCUMENTS

| | | | |
|---|---|---|---|
| 3,085,463 A | 4/1963 | Hallock | |
| 3,136,203 A * | 6/1964 | Davis | 411/38 |
| 3,236,143 A | 2/1966 | Wing | |
| 3,253,495 A | 5/1966 | Orloff | |
| 3,277,771 A | 10/1966 | Reynolds | |
| 3,322,449 A * | 5/1967 | Becker | 403/388 |
| 3,345,900 A | 10/1967 | Villo | |
| 3,461,771 A | 8/1969 | Briles | |
| 3,505,921 A | 4/1970 | Wigam | |
| 4,007,659 A | 2/1977 | Stencel | |
| 4,015,505 A | 4/1977 | Murray | |
| 4,033,222 A | 7/1977 | Wilson | |
| 4,122,753 A * | 10/1978 | Kuhlmann et al. | 411/2 |
| 4,168,650 A | 9/1979 | Dahl et al. | |
| 4,203,346 A | 5/1980 | Hall et al. | |
| 4,237,768 A | 12/1980 | Volkmann | |
| 4,263,834 A | 4/1981 | Dudash | |
| 4,457,652 A | 7/1984 | Pratt | |
| 4,519,735 A | 5/1985 | Machtle | |
| 4,579,491 A * | 4/1986 | Kull | 411/43 |
| 4,602,902 A | 7/1986 | Herb | |
| 4,659,271 A | 4/1987 | Pratt et al. | |
| 4,692,076 A * | 9/1987 | Herb | 411/55 |
| 4,714,391 A | 12/1987 | Bergner | |
| 4,747,204 A | 5/1988 | Pratt | |
| 4,752,169 A | 6/1988 | Pratt | |
| 4,772,167 A | 9/1988 | Beals | |
| 4,865,499 A | 9/1989 | Lacey | |
| 4,875,815 A | 10/1989 | Phillips, II | |
| 4,929,134 A | 5/1990 | Bergner | |
| 4,950,115 A | 8/1990 | Sadri | |
| 4,979,857 A * | 12/1990 | Wing | 411/5 |
| 4,984,945 A | 1/1991 | Bergner | |
| 4,988,247 A | 1/1991 | Summerlin | |
| 5,030,050 A | 7/1991 | Auriol | |
| 5,044,849 A * | 9/1991 | Starke | 411/38 |
| 5,066,179 A | 11/1991 | Pratt | |
| 5,152,648 A | 10/1992 | Pratt | |
| 5,213,460 A * | 5/1993 | Sadri et al. | 411/43 |
| 5,498,110 A | 3/1996 | Stencel et al. | |
| 5,569,005 A | 10/1996 | Millington | |
| 5,603,592 A * | 2/1997 | Sadri et al. | 411/34 |
| 5,620,287 A | 4/1997 | Pratt | |
| 5,634,751 A | 6/1997 | Stencel et al. | |
| 5,651,649 A * | 7/1997 | Sadri et al. | 411/34 |
| 5,759,001 A | 6/1998 | Smith | |
| 5,779,410 A | 7/1998 | Lautenschlager | |
| 5,816,761 A | 10/1998 | Cassatt et al. | |
| 5,947,667 A | 9/1999 | Cassatt et al. | |
| 6,007,009 A | 12/1999 | Sheridan | |
| 6,062,783 A | 5/2000 | Austin | |
| 6,224,309 B1 * | 5/2001 | Yamamoto | 411/11 |
| 6,247,883 B1 * | 6/2001 | Monserratt | 411/34 |
| 6,537,005 B1 * | 3/2003 | Denham | 411/42 |
| 6,547,500 B2 | 4/2003 | Cosenza | |
| 6,746,191 B2 | 6/2004 | Edland | |
| 6,868,757 B2 | 3/2005 | Hufnagl et al. | |
| 6,893,196 B2 * | 5/2005 | Wille | 411/34 |
| 6,896,460 B2 | 5/2005 | Enomoto | |
| 6,935,821 B2 | 8/2005 | Bodin | |
| 7,681,426 B2 | 3/2010 | Main et al. | |
| 8,075,234 B2 | 12/2011 | McClure | |
| 2002/0146298 A1 | 10/2002 | Cosenza | |
| 2003/0183045 A1 * | 10/2003 | Junkers | 81/54 |
| 2004/0022596 A1 | 2/2004 | Belanger | |
| 2004/0033119 A1 | 2/2004 | Hufnagl et al. | |
| 2005/0123372 A1 | 6/2005 | Sato | |
| 2005/0201845 A1 | 9/2005 | Keenen | |
| 2006/0062650 A1 | 3/2006 | Kenner | |
| 2007/0242035 A1 | 10/2007 | Tsao | |
| 2007/0243035 A1 | 10/2007 | Pratt | |
| 2007/0243037 A1 | 10/2007 | Pratt | |
| 2008/0044252 A1 | 2/2008 | Scheinberger et al. | |

OTHER PUBLICATIONS

International Search Report and Written Opinion from PCT/US2010/028832.
International Search Report and Written Opinion from PCT/US2010/042317.
Extended European Search Report from EP07839322.0 filed Oct. 5, 2007.
Non-Final Office Action received in related U.S. Appl. No. 11/973,278 dated May 25, 2011.
Non-Final Office Action received in related U.S. Appl. No. 11/973,278 mailed Nov. 8, 2010.
Non-Final Office Action dated Feb. 17, 2012 received in related U.S. Appl. No. 11/973,278, filed Oct. 5, 2007.

* cited by examiner

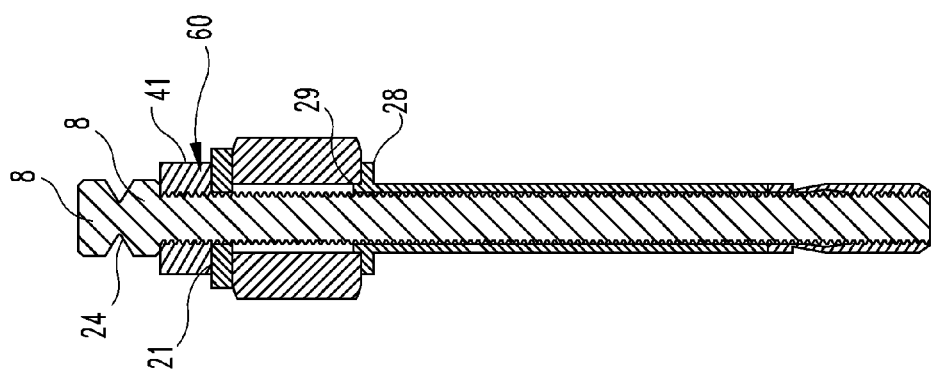
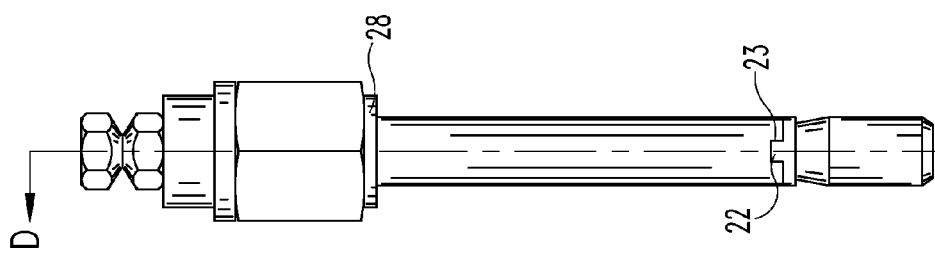

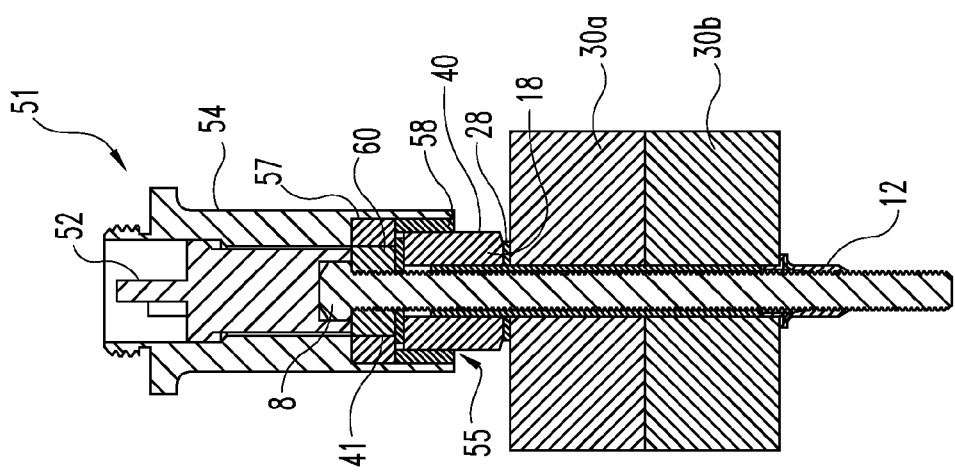
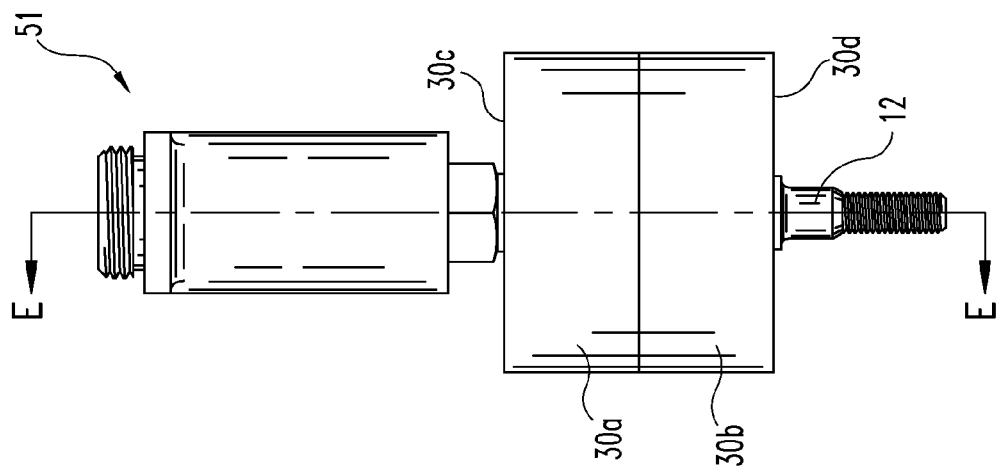
Fig. 5B
Fig. 5A

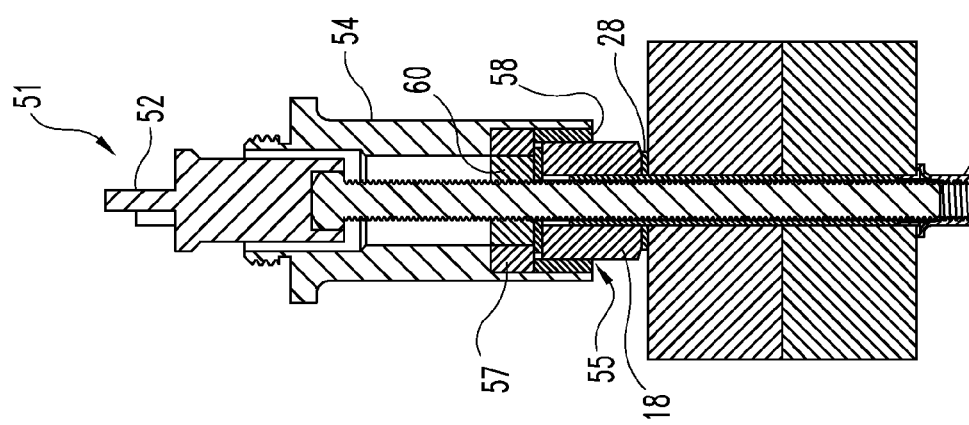
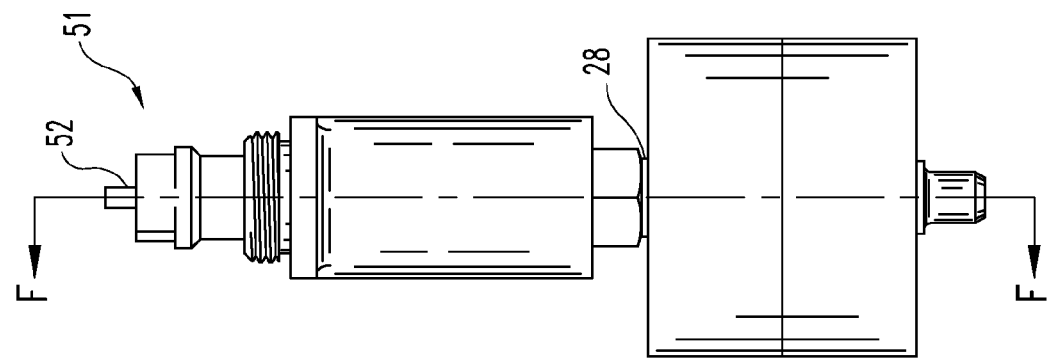

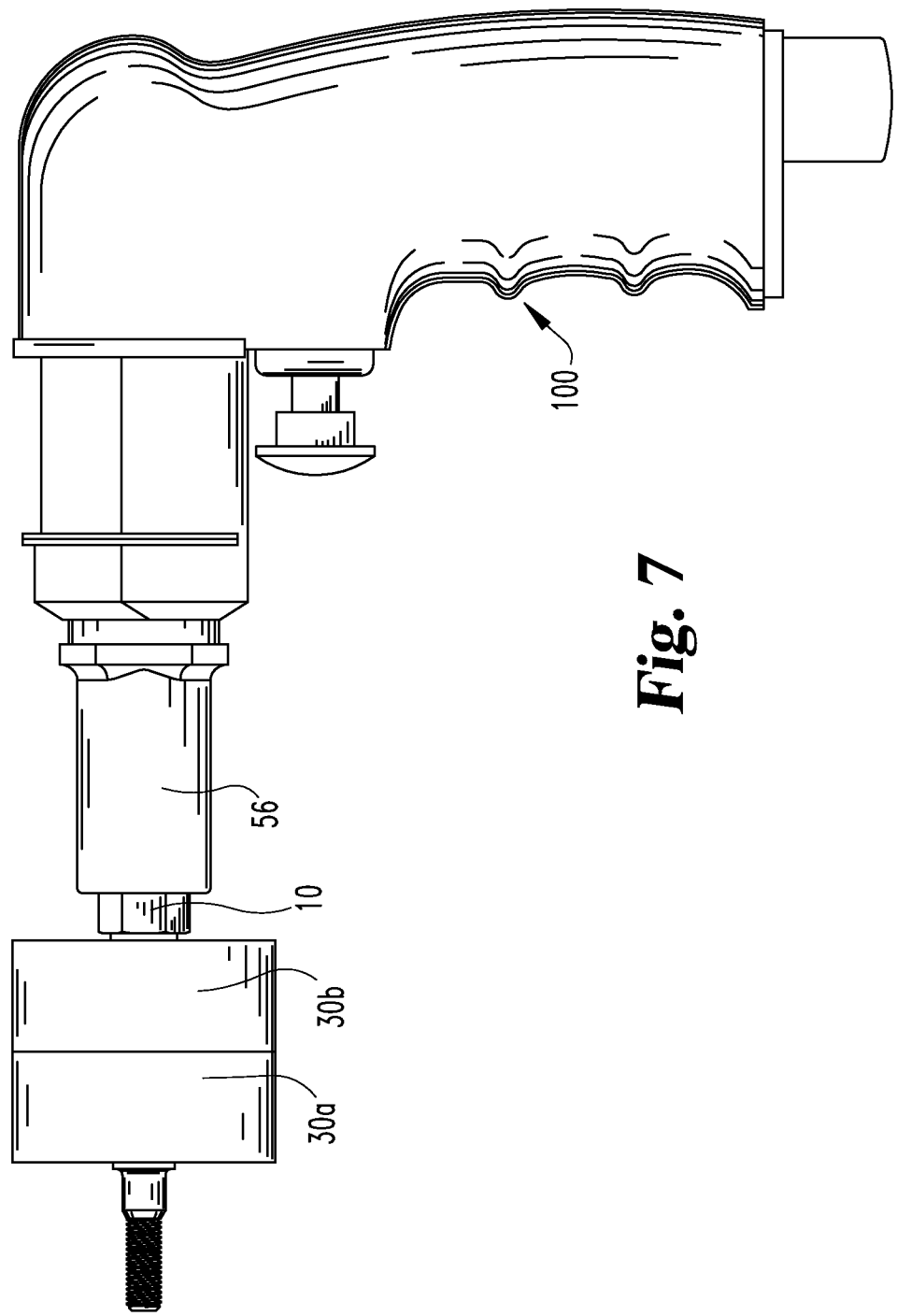

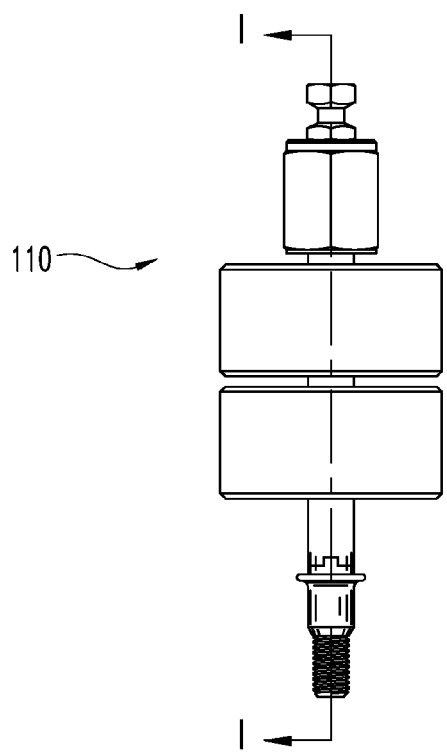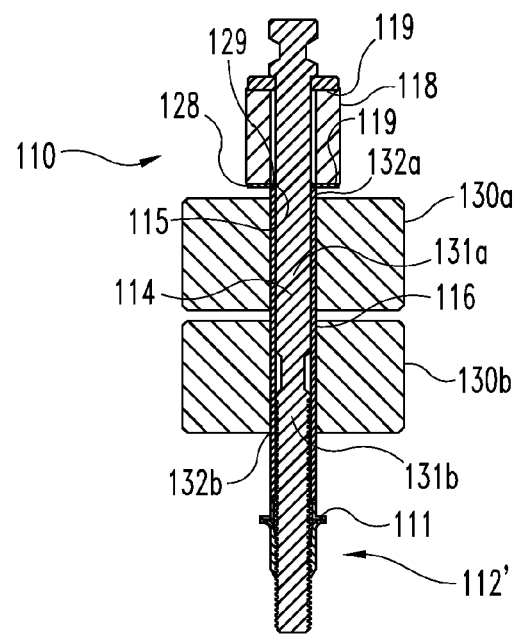
*Fig. 14A*
*Fig. 14B*
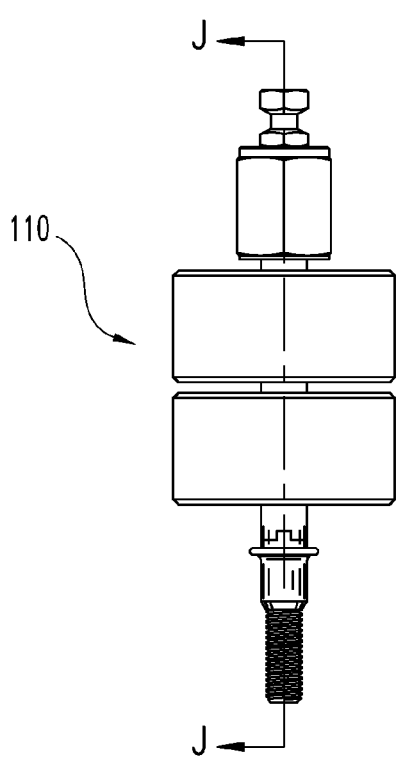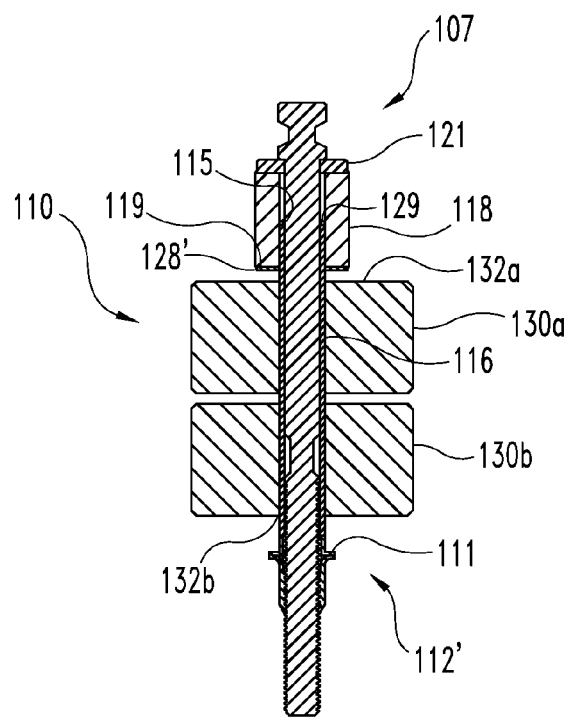
*Fig. 15A*
*Fig. 15B*

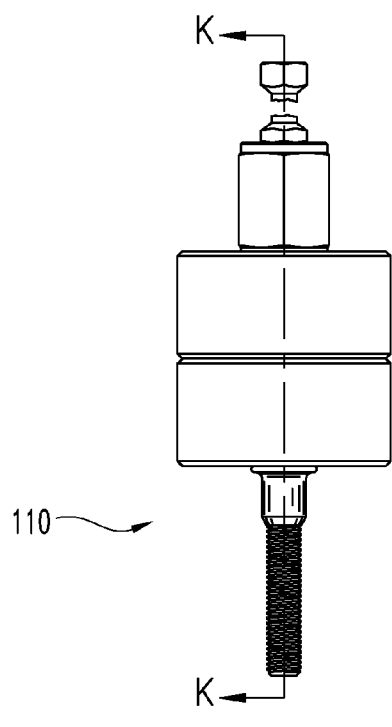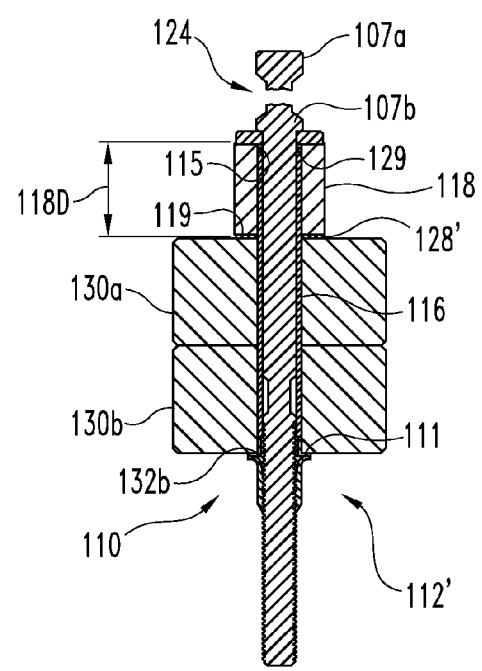
*Fig. 16A*  *Fig. 16B*
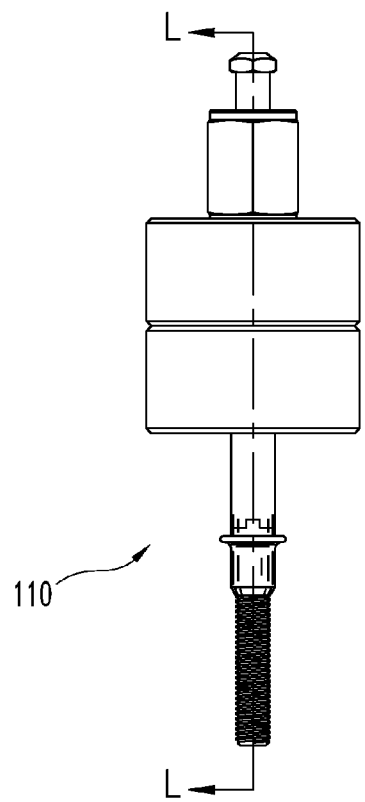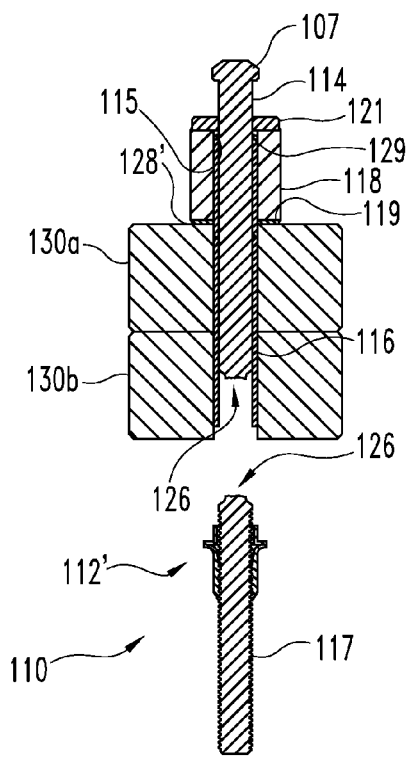
*Fig. 17A*  *Fig. 17B*

DUAL-ACTION DISPOSABLE CLAMP

This application is a continuation in part of U.S. Utility patent application Ser. No. 11/973,278, filed on Oct. 5, 2007 which claims the benefit of U.S. Provisional Patent Application No. 60/849,515 entitled "DUAL-ACTION DISPOSABLE CLAMP" filed on Oct. 5, 2006; U.S. Provisional Patent Application No. 60/857,700 entitled "DUAL-ACTION DISPOSABLE CLAMP" filed on Nov. 8, 2006; and U.S. Provisional Patent Application No. 60/901,171 entitled "DUAL-ACTION DISPOSABLE CLAMP WITH CLUTCH NUT" filed on Feb. 13, 2007, which are each hereby incorporated by reference in their entirety.

FIELD OF THE INVENTION

The present invention relates to a temporary fastener, and more specifically to a disposable clamp.

BACKGROUND OF THE INVENTION

Modern aircraft are manufactured from numerous panels and other parts that are fastened together with rivets, screws, bolts, and other permanent fasteners. To aid in assembly, parts are typically held together with temporary clamps and fixtures until permanent fasteners can be installed. Parts that incorporate sealant on the mating surfaces require that the temporary clamps exert sufficient force to squeeze excessive sealant from the joint while pulling parts together before the sealant fully cures. Heavy structures fastened with five-sixteenths of an inch size permanent fasteners, for example, require in excess of 500 pounds clamp load to squeeze the sealant out to an acceptable thickness and hold the components together. Other applications, such as in wing-to-body joints, require upwards of 1500 pounds with five-sixteenths of an inch size fasteners to temporarily secure components. The clamp load requirements for other sizes are generally proportional to the cross-sectional area of the basic fastener diameter.

Blind hole clamps are desirable for airframe assembly, because their installation and removal can be more easily automated than the installation and removal of conventional bolts and nuts. However, existing blind hole clamps do not have a blind head large enough to avoid surface damage on the blind side panel when high clamp loads are imparted.

Oftentimes, one or more work pieces are joined with clamps to maintain part orientation during an autoclave curing cycle. Threaded-type reusable blind clamps are capable of high clamp loads, but lack the smooth shank needed to avoid clogging with resin as the parts are cured. As a result, the clamps are difficult to remove and may damage the work pieces upon removal. Blind tack rivets may have the required smooth shank but are incapable of imparting sufficient clamp load to maintain parts in the required orientation. Conventional slave bolts are not capable of automated installation and removal.

In addition, threaded temporary blind clamps are easily clogged with sealant and resins, making removal from assemblies difficult and necessitating cleaning before they may be reused. Another problem with threaded temporary fasteners is that they protrude above the accessible panel surface by a relatively large amount. Accordingly, robotic assembly equipment must retract or back away from the work pieces to avoid collisions with installed clamps. As a result, installation of threaded temporary fasteners requires additional time to traverse from one location to another.

Finally, the clamping capability of threaded temporary clamps is limited, because the blind head is discontinuous and high clamp loads result in surface damage to the work pieces. Temporary blind tack rivets have a low profile but must be removed by drilling through the manufactured head. Drilling through the head, however, generates metal chips that can damage panel surfaces. Oftentimes, for example, the rivet spins in the hole during the drilling operation, halting the advance of the drill bit through the tack rivet and prolonging the removal cycle time. Tack rivets also have very low clamp loads and produce a small blind-side upset that is not suitable for use in laminated composite panels.

Slave bolts may consist of a conventional nut and bolt or a pull-type lock bolt with a swage collar. Slave bolts may provide a non-clogging shank, non-drill out removal and high clamp loads. However, slave bolts require access to both sides of the work pieces and, in many cases, two operators to install. Two-sided installations are difficult and costly to automate.

Therefore, a need exists for a clamp, or a temporary fastener, having a smooth cylindrical shank without grooves, threads and other discontinuities that may become clogged with sealant or cured resin and which is capable of high clamp loads (greater than 500 pounds for a five-sixteenths of an inch size clamp) without damaging fragile panel surfaces. In addition, a need exists for a low profile temporary clamping fastener capable of installation and removal from a single accessible side of the work pieces, preferably by robotic equipment, in a manner that does not generate drilling debris. A one-sided installation and removal process is desired for saving labor costs over a conventional two-person operation using nuts and bolts. Finally, a need exists for a temporary fastener having a predetermined geometry to control installation clamp loads rather than allowing the installation force to be controlled by outside influences, such as, operator skill.

BRIEF DESCRIPTION OF THE DRAWINGS

FIGS. 4A and 4B illustrate a side elevational view and a cross-sectional view along line D-D of a clamp having a clutch nut in an embodiment of the present invention.

FIGS. 5A and 5B illustrate a side elevational view and a cross-sectional view along line E-E of the clamp of FIGS. 4A and 4B with a wrenching tool engaged in an embodiment of the present invention.

FIGS. 6A and 6B illustrate a side elevational view and a cross-sectional view along line F-F of the clamp of FIGS. 4A and 4B with a wrenching tool engaged where the clamp may be removed from the work piece in an embodiment of the present invention.

FIG. 7 illustrates a power tool engaged with the clamp of FIGS. 3A through 3C in an embodiment of the present invention.

FIGS. 14A and 14B illustrate a side elevational view and a cross-sectional view along line I-I of the clamp of FIGS. 13A and 13B partially installed in a work piece.

FIGS. 15A and 15B illustrate a side elevational view and a cross sectional view along line J-J of the clamp in FIGS. 13A and 13B partially installed in a work piece.

FIGS. 16A and 16B illustrate a side elevational view and a cross-sectional view along line K-K of the clamp in FIGS. 13A and 13B in an installed condition in a work piece.

FIGS. 17A and 17B illustrate a side elevational view and a cross-sectional view along line L-L of the clamp of FIGS. 13A and 13B where the clamp may be removed from the work piece.

DETAILED DESCRIPTION OF THE DRAWINGS

Figure 1C:
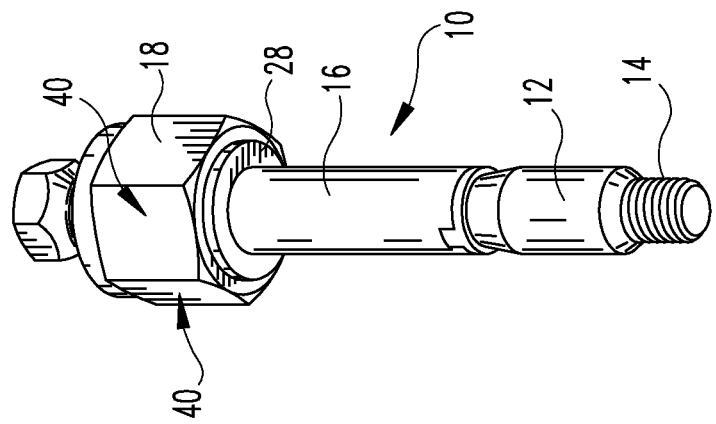
FIGS. 1A, 1B and 1C illustrate a side elevational view, a perspective view, and a cross-sectional view along line A-A of a clamp in an embodiment of the present invention.

For the purpose of promoting an understanding of the disclosure, reference will now be made to certain embodiments thereof and specific language will be used to describe the same. It will nevertheless be understood that no limitation of the scope of this disclosure is thereby intended, such alterations, further modifications and further applications of the principles described herein being contemplated as would normally occur to one skilled in the art to which the disclosure relates. In several FIGs., where there are the same or similar elements, those elements are designated with similar reference numerals.

Referring now to the drawings, and in particular to FIGS. 1A-3C, a clamp 10 is illustrated generally comprising: a core bolt 14 in threaded engagement with an expander 12, a shank 16, a spacer 18 and a thrust washer 21. The expander 12 is positioned at a first end of the core bolt 14 such that the core bolt 14 is movable through the expander 12. Specifically, applying torque to the core bolt 14 drives the core bolt 14 through the expander 12. The core bolt 14 may have wrenching portions 8 on head portion 19 that are sized and shaped to be rotated by, for example, a wrenching tool. In one embodiment, the expander 12 is internally threaded and is in meshing engagement with external threads of the core bolt 14.

Figure 1B:
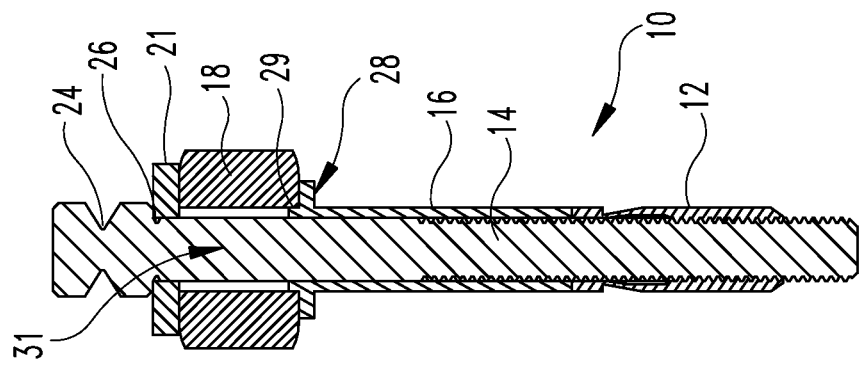
Figure 2C:
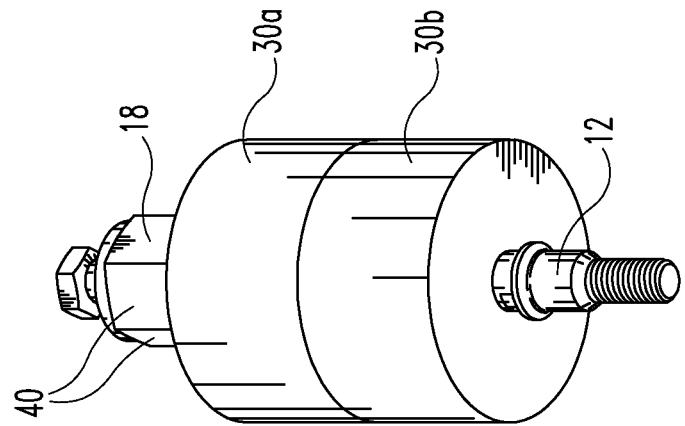
FIGS. 2A, 2B and 2C illustrate a side elevational view, a cross-sectional view along line B-B, and a perspective view of the clamp of FIGS. 1A-1C at least partially installed in a work piece in an embodiment of the present invention.
Figure 2B:
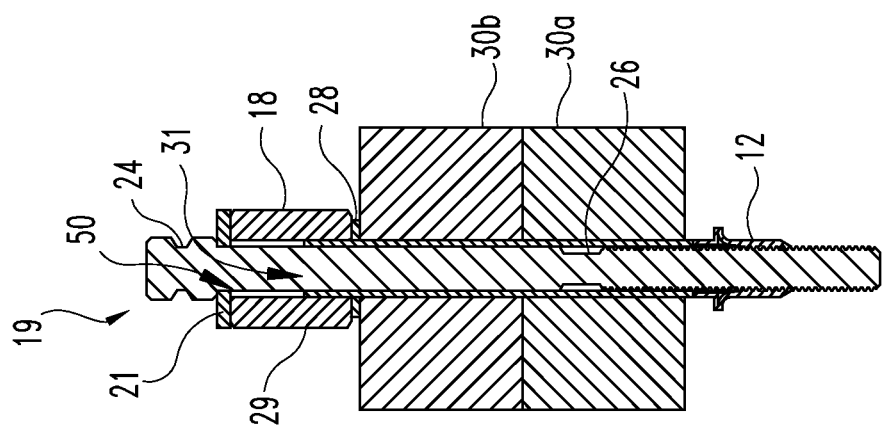

In a preferred embodiment, a first break groove 24 is positioned at a second end of the core bolt 14, opposite the expander 12. A second break groove 26 is positioned between the first break groove 24 and the first end of the core bolt 14. The first break groove 24 and the second break groove 26 may be weakened portions of the core bolt 14 that fail at predetermined torque or compression loads. In one embodiment as shown in FIGS. 1B and 3B, second break groove 26 is a notch around the circumference of core bolt 14. In another embodiment, as shown in FIG. 2B, second break groove 26 is a dog-bone shaped narrowing of core bolt 14. These embodiments of second break groove 26 are discussed in greater detail below.

Figure 3C:
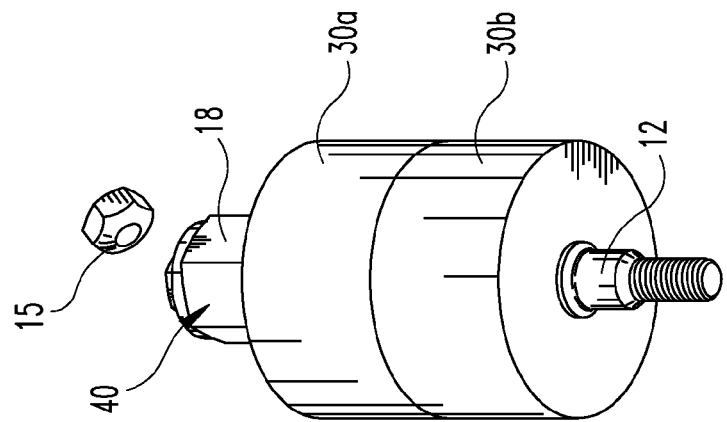
FIGS. 3A, 3B and 3C illustrate a side elevational view, a cross-sectional view along line C-C, and a perspective view of the clamp of FIGS. 1A-1C in an installed condition in an embodiment of the present invention.
Figure 3B:
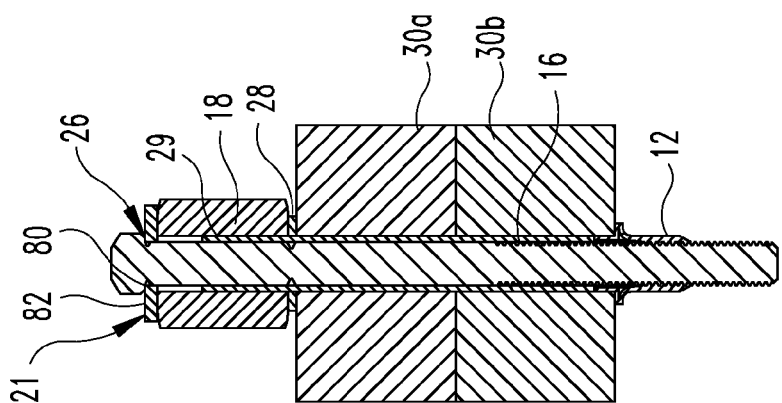
Figure 3A:
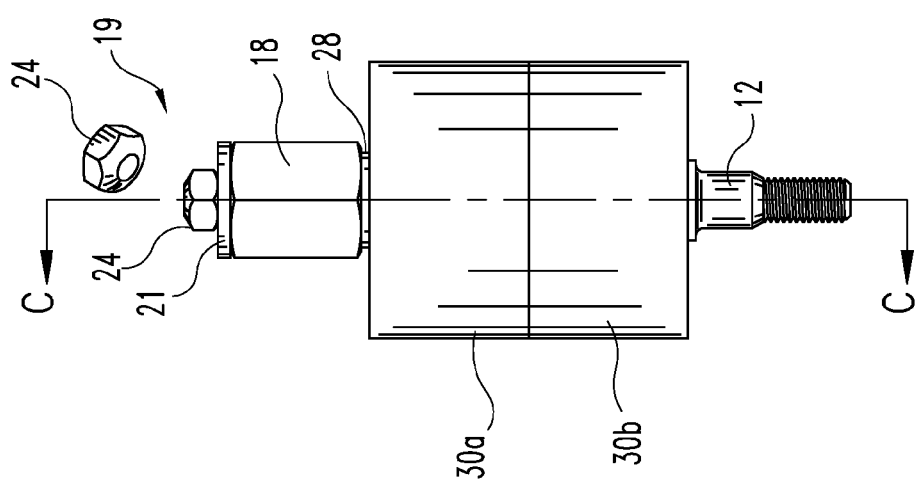

In an exemplary embodiment, the first break groove 24 is sized to fail prior to the second break groove 26, as shown in FIGS. 3A-3C. For example, at a torque sufficient to clamp work pieces 30a, 30b together a desired amount, the first break groove 24 fractures and a portion of the core bolt 14 is severed. The second break groove 26 will remain intact until it is desired to remove the core bolt 14 from the work pieces 30a, 30b. To do so, additional torque may be provided on the core bolt 14 to fracture the core bolt 14 at the second break groove 26.

As discussed above, FIGS. 1-3 disclose 3 sequential stages of installation of clamp 10. In FIG. 1B and 3B, second break groove 26 is illustrated as a groove under head portion 19. In FIG. 2B, second break groove 26 is illustrated as a larger, dog bone shaped region above the threads on core bolt 14. The balance of the disclosed structures are the same in FIGS. 1-3. The variations in the break groove structures are presented as alternative embodiments of break groove styles and locations.

Figure 1A:
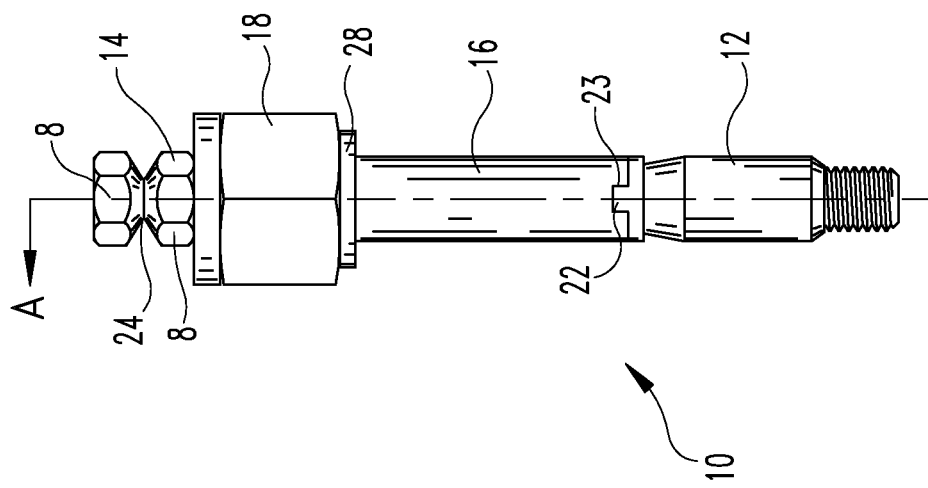

A shank 16 may be positioned between the first end of the core bolt 14 and the expander 12. In a preferred embodiment, the expander 12 may be rotationally keyed to the shank 16 such that rotation of the shank 16 rotates the expander 12, as shown in FIGS. 1A-1C. In the illustrated embodiment, expander 12 includes key 22 mated in channel 23 on shank 16. The mated connection between key 22 and channel 23 permits continued rotational keying between expander 12 and shank 16 in the event shank 16 is longitudinally displaced with respect to expander 12. The threaded core bolt 14 slides inside the shank 16 along the length of the core bolt 14. As torque is applied to the core bolt 14, the core bolt 14 rotates in the shank 16 and threads into the expander 12 as shown in FIGS. 2A-3C. The core bolt 14 moves through the expander 12 causing the expander 12 to bulb or to expand to a size in which the expander 12 has a larger diameter than the diameter of the shank 16 and the diameter of the hole in the work pieces.

The shank 16 has a flange 28 extending outward from the outer diameter of the shank 16. The flange 28 may be an enlarged portion extending in a direction perpendicular to the axis of the shank 16. In a preferred embodiment, the flange 28 is integrally formed with the shank 16. The flange 28 may be sized such that the flange 28 limits the amount of the load that may be induced into the expander 12. At a predetermined axial load, the flange 28 shears loose from the shank 16 and allows the shank 16 to move into bore 31 of the spacer 18.

A spacer 18 may be positioned at an end of the shank 16. In an embodiment, the spacer 18 engages a flange 28 of the shank 16 and may prevent rotation of the shank 16 when torque is applied to the core bolt 14. The spacer 18 may have wrenching flats 40 for engagement with wrenching tools, for example, a tool to prevent rotation of the spacer 18. The spacer 18 may have a bore 31 in which the core bolt 14 may extend there through.

A boss 29 may extend from an end of the shank 16 opposite the expander 12. The spacer 18 may be positioned at an end of the shank 16 adjacent the boss 29. The bore 31 of the spacer 18 may be an interference fit with the boss 29 of the shank 16 such that the shank 16 is rotationally restrained. The boss 29 of the shank 16 extends into and frictionally fits within the spacer 18. In an embodiment, the boss 29 and the bore 31 in the spacer 18 are non-circular to rotationally key the shank 16 and the spacer 18 together. For example, the bore 31 and the boss 29 may have corresponding shapes such that relative rotation is prevented. The spacer 18 may be positioned such that the underside of the spacer 18 abuts the flange 28 of the shank 16.

A washer 21 may be positioned between the spacer 18 and an end of the core bolt 14. In one embodiment, the washer 21 may be a thrust washer to spread the compressive stresses over a larger area than without the washer 21. Bearing surfaces 80 of the core bolt 14 may bear against a top side 82 of the washer 21, as best illustrated in FIG. 3B. In another embodiment, the washer 21 may be bowed to act as a spring washer, for example, to maintain compressive loads on the work pieces 30a, 30b.

Figure 2A:
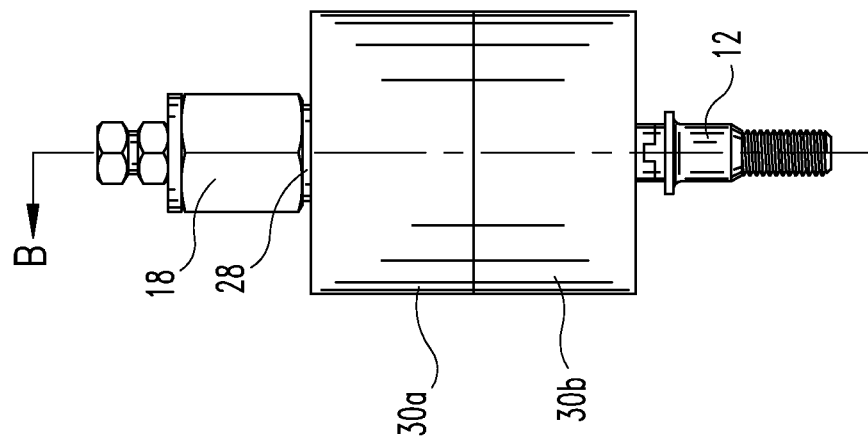

The clamp 10 may be installed by an automated process or by automated equipment, such as robotic equipment. For example, after inserting the clamp 10 into aligned apertures in the work pieces 30a, 30b, a tool 100 may engage the spacer 18 and the wrenching surfaces 40 of the spacer 18. In one embodiment, the clamp 10 may be inserted into a top surface 30c of the work piece 30a and may extend through to a blind side 30d of the work piece 30b as illustrated in FIG. 2A. In one embodiment, the tool 100 (see FIG. 7) may have a first component 56 for rotationally restraining the spacer 18, which, in turn, prevents the shank 16 from rotating as illustrated in FIG. 7. The tool 100 may have a second component (such as tool 52 illustrated in FIGS. 5B and 6B and described below) to provide torque to the core bolt 14.

In alternative embodiments, the tool 100 may be used by or incorporated into robotic or other automated equipment to thread the core bolt 14 into the expander 12 and cause the expander 12 to bulb or otherwise enlarge. Once the expander 12 is fully bulbed, as shown in an embodiment in FIGS. 3A-3C, the compressive load on the shank 16 increases until the flange 28 on the shank 16 shears loose at a predetermined compressive load. In one embodiment, the flange 28 shears at a compressive load of 1000 pounds for a five-sixteenths inch size fastener. Continued rotation of the core bolt 14 causes the shank 16, with the expander 12 attached, to translate into the spacer 18 until the expander 12 contacts the far side of the work pieces 30a, 30b. When the flange 28 shears loose, the torque required to drive the core bolt 14 may drop to a negligible amount or nearly zero, but the torque required to drive the core bolt 14 may increase as the expander 12 contacts and clamps the work pieces 30a, 30b together.

The installation of the clamp 10 may be controlled by controlling the installation torque, or by use of the first break groove 24. For example, when the torsion required to continue rotating the core bolt 14 exceeds the strength of the first break groove 24, a portion 15 of the core bolt 14 severs as shown in FIGS. 3A-3C. To facilitate removal of the clamp 10, the tool 100 may be applied to the core bolt 14 to apply torque and rotate the core bolt 14. At a predetermined amount of torque, the second break groove 26 fails and the spacer 18, the washer 21, and the shank 16 are discarded from the accessible-side of the work pieces 30a, 30b. The expander 12 and remaining portion of the core bolt 14 may be pushed through the work pieces 30a, 30b and discarded or otherwise moved through the work pieces 30a, 30b.

Advantageously, the tool 100 may be used to both install and to remove the clamp 10. To this end, the clamp 10 may effectively be used as a temporary fastener for clamping panels and other objects together. In addition, drilling to remove the clamp 10 is eliminated. Accordingly, the damage caused by off-center drilling and the generation of metal chips caused by drilling are eliminated.

Figure 8:
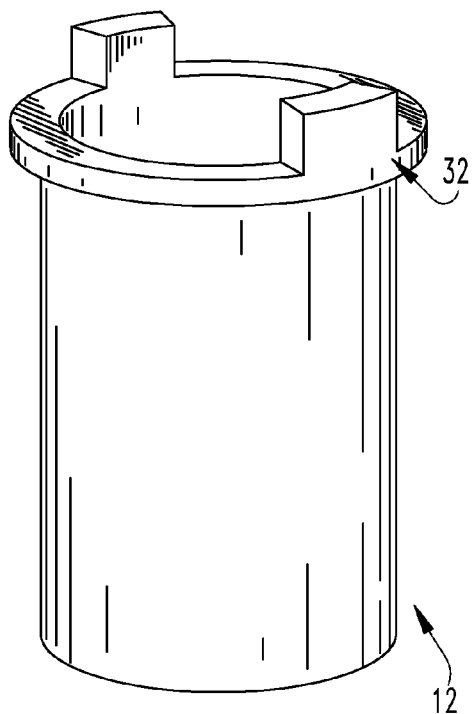
FIG. 8 shows a representative perspective view of an uncrimped expander component in an embodiment of the present invention.
Figure 9:
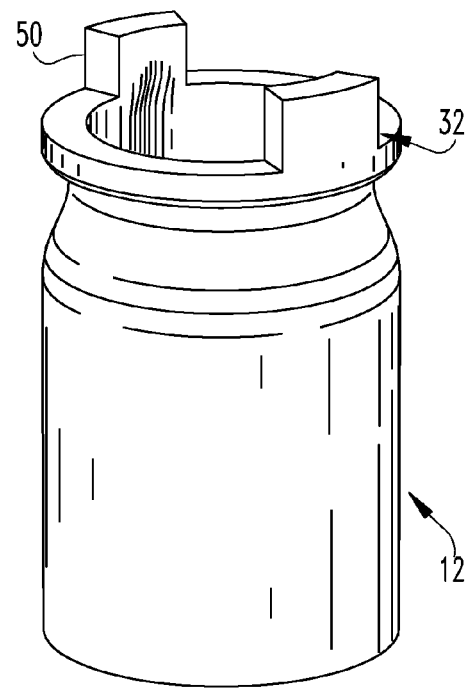
FIG. 9 shows a representative perspective view of an expander component as crimped in an embodiment of the present invention.
Figure 10:
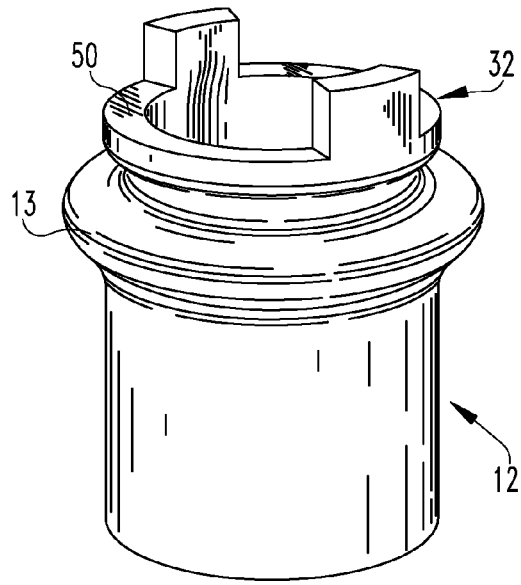
FIG. 10 shows a representative perspective view of an expander component as partially formed in an embodiment of the present invention.
Figure 11:
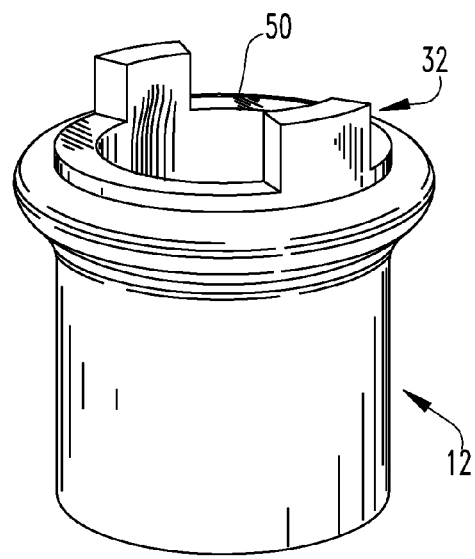
FIG. 11 shows a representative perspective view of an expander component as completely formed in an embodiment of the present invention.
Figure 12:
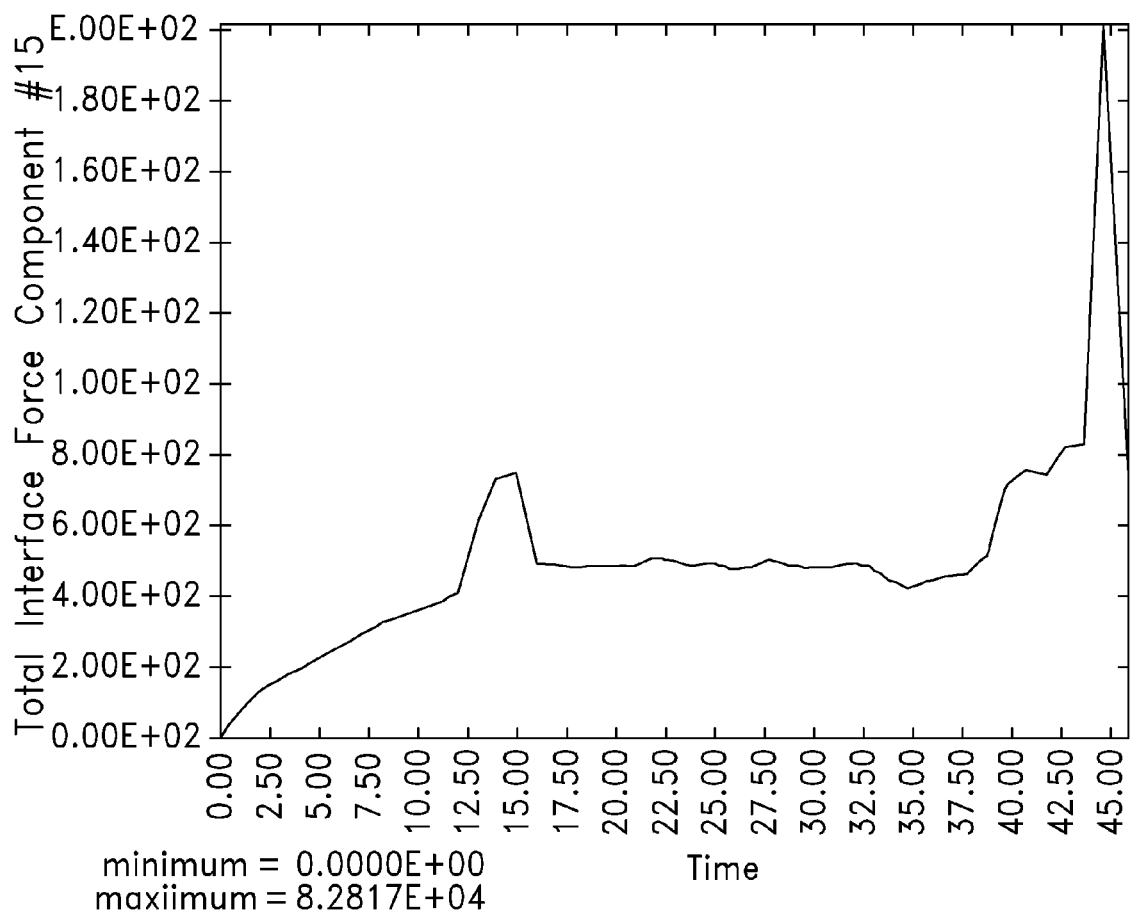
FIG. 12 illustrates a graph of a predictable load curve of an expander in an embodiment of the present invention.

In addition, the bulbing nature of the expander 12 ensures that clamp loads are spread over a relatively large area to avoid damaging the work pieces 30a, 30b. The pre-bulbed geometry of the expander 12 ensures that the apertures of the work pieces 30a, 30b do not become rounded or otherwise damaged. In an embodiment, the expander 12 may have a flanged end 32, as illustrated in FIGS. 8-11, which show expander 12 in four different stages. FIG. 8 shows expander 12 as manufactured prior to the flanged end 32 being crimped or swaged inwardly during manufacture as best shown in FIG. 9. In a preferred embodiment, the expander 12 may have a thicker-walled leading edge 50 that resists bulking and a thin-walled bulbing region 13 that begins bulbing at a diameter slightly less than the hole diameter in the work pieces 30a, 30b such that edge interference is avoided, as illustrated in FIGS. 10 and 11. FIG. 12 illustrates a predicted load curve with bulbing of the expander 12 indicated at approximately eight hundred pounds for a five-sixteenths size clamp. Of course, the clamp 10 may be modified to change the load in which bulbing occurs as will be appreciated by one of ordinary skill in the art.

Advantageously, the clamp 10 avoids clogging with resins and sealants due to the cylindrical and smooth shape of the shank 16. The design, shape and size of the clamp 10 allows incorporation of the clamp 10 into many applications where known rivets and clamps are not suitable, such as, in use with composite material cured in autoclave.

The grip range of the clamp 10 may correspond to or may be controlled by the length of the spacer 18. For example, the spacer 18 may have a length sufficient to receive the shank 16 after the flange 28 shears loose. A low profile for efficient robotic applications is possible by limiting the grip range. For example, a five-sixteenths of an inch size clamp having a three-eighths inch gripping range may have an installed protrusion approximately one inch above the accessible-side of the work pieces 30a, 30b.

In another embodiment, the clamp 10 has a nut 60 that is at least partially engaged with the core bolt 14 as illustrated in FIGS. 4A-6B. In such an embodiment, the core bolt 14 may be threaded from the end adjacent the expander 12 to the wrenching portions 8. Accordingly, the nut 60 may be in threaded engagement with the core bolt 14. The nut 60 may be, for example, cylindrical and internally-threaded. In one embodiment, the nut 60 may be positioned between the thrust washer 21 and the head portion 19 of core bolt 14. Upon installation, the nut 60 may freely rotate with the core bolt 14 and may act as an extension of a head portion 19 of the core bolt 14.

Referring to FIGS. 5A and 5B, tool 51 is illustrated. Tool 51 comprises inner tool 52 and outer tool 54. Outer tool 54 comprises cylindrical bore 55 with one-way clutch 57 and hex insert 58 press fit inside cylindrical bore 55. Inner tool 52 includes wrenching surfaces or a one-way clutch, as appropriate; to rotate wrenching portions 8 on core bolt 14. One-way clutch 57, as shown, is engaged with outer surface 41 of nut 60. Hex-insert 58, as shown, is engaged with wrenching flats 40 on spacer 18.

During removal of the clamp 10, as illustrated in FIGS. 6A and 6B, the nut 60 may be fixed and prevented from rotation by, for example, one-way clutch 57. An outer surface 41 of the nut 60, for example, may be engaged by a one-way clutch, a roller-type clutch or other structure that allows rotation of the nut 60 during installation but prevents rotation of the nut 60 when the core bolt 14 is rotated in the removal direction. Upon removal, the core bolt 14 unthreads from the nut 60 and the expander 12. The expander 12 may remain keyed to the shank 16 which remains keyed to the spacer 18.

In such an embodiment, the first break groove 24 may be incorporated into the clamp 10 and may be dependent upon whether the clamp 10 is configured for installation with torque-controlled tools. The second break groove 26 may be absent in this embodiment since removal may be accomplished by unthreading the core bolt 14 from the assembly, rather than fracturing the core bolt 14 to separate components of the clamp 10. Of course, the first break groove 24 and the second break groove 26 may be incorporated in such an embodiment as will be appreciated by one of ordinary skill in the art.

Referring now to FIGS. 13A-18, clamp 110 is illustrated in several embodiments. Clamp 110 includes core bolt 114, thrust washer 121, spacer 118, shift washer 128, shank 116 and expander 112.

Figure 13A:
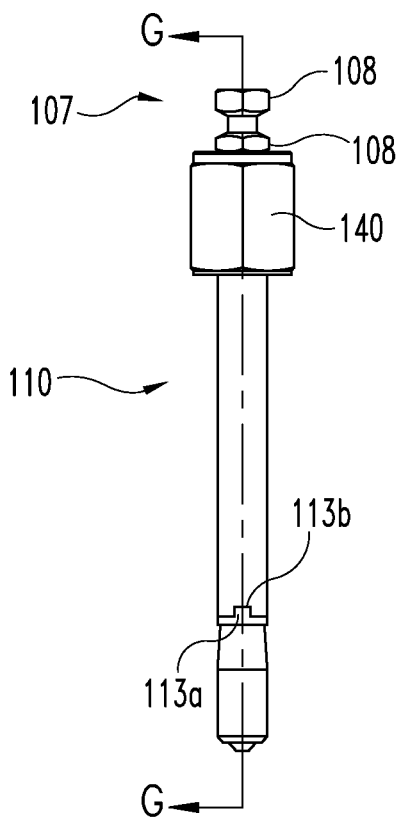
FIGS. 13A and 13B illustrate a side elevational view and a cross-sectional view along line G-G of an alternative embodiment of a clamp.
Figure 13B:
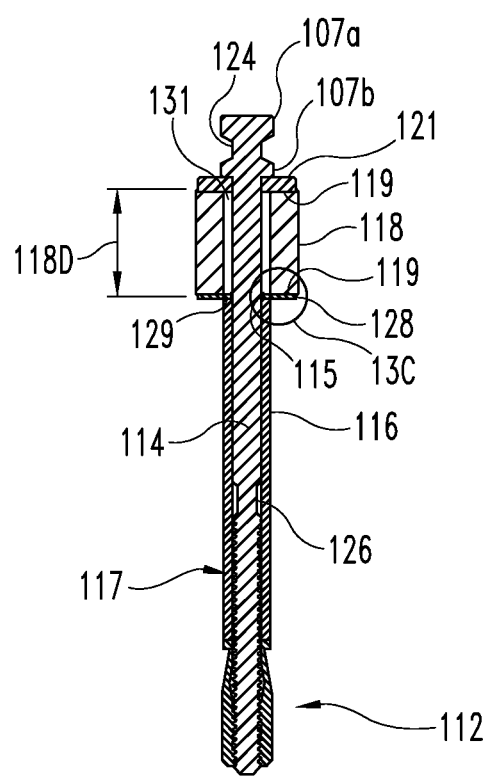
Figure 13C:
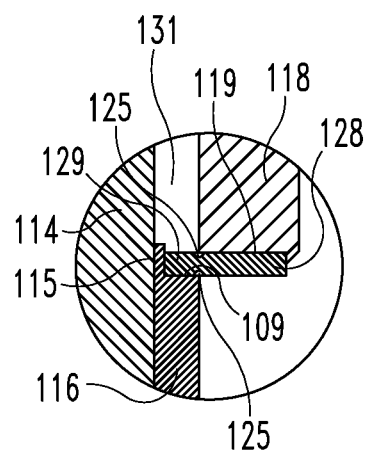
FIG. 13C illustrates a portion of the cross-sectional view of FIG. 13B.

As shown in FIGS. 13A, 13B and 13C, core bolt 114 comprises bolt head 107 including wrenching portions 108, top portion 107a, bottom portion 107b and first weakened region 124. Core bolt 114 also includes second weakened region 126 and threaded portion 117. Shift washer 128 includes shear segment 129 and weakened regions 125. In some embodiments, shift washer 128 and/or thrust washer 121 act as a spring washer to maintain compressive loads in clamp 110. Shank 116 includes boss 115, shoulder 109 and key receptacle 113b and expander 112 includes key 113a. Spacer 118 includes bore 131, wrenching flats 140 and recesses 119 on the top and bottom of spacer 118.

Clamp 110 shares several similar features with clamp 10 described above but also includes several differences. In particular, it should be noted that first weakened region 124 differs from first break groove 24 in that first weakened region 124 includes longer area of minimum diameter as compared to first break groove 24. As will be discussed below, either weakened region 124 or first break groove 24 may be used in any of the embodiments illustrated herein. Similarly, second weakened region 126 also includes an elongated portion having a reduced diameter as compared with second break groove 26 as shown in FIGS. 1B and 3B.

Another difference between clamp 110 and clamp 10 is that flange 28 of clamp 10 is essentially replaced by shift washer 128 in clamp 110. While flange 28 is disclosed as integral with shank 16, shift washer 128 is separate from shank 116. In either embodiment, flange 28 or shift washer 128 serves as a means to prevent shank 16 or shank 116 from translating into bore 31 or bore 131 of spacer 18 or spacer 118 until after expander 12 or expander 112 has substantially completed bulbed, as described herein. In yet another embodiment (not illustrated), shift washer 128 is incorporated with spacer 118 as a unitary structure which also serves as a means to prevent shank 16 or shank 116 from translating into bore 31 or bore 131 of spacer 18 or spacer 118 until after expander 12 or expander 112 has substantially completed bulbed.

Clamp 110 is configured with thrust washer 121 adjacent to bottom portion 107b and partially in recess 119 on the top of spacer 118 with shift washer 128 partially in recess 119 on the bottom of spacer 118. The recess 119 on the bottom of spacer 118 and/or shift washer 128 may optionally include knurling or other friction enhancers or mechanical interlocks at the interface between these components as are known in the art to reduce relative rotation between spacer 118 and shift washer 128.

Boss 115 passes through the center of shift washer 128 with shoulder 109 on shank 116 abutting shift washer 128 against shear segment 129 over core bolt 114. Boss 115 may extend between the smallest internal dimension of shift washer 128 and core bolt 114. Boss 115 may have an axial cross-sectional area less than an axial cross-sectional area of shank 116. As shown in FIG. 13B, the inner diameter of shank 116 may be smaller than the smallest inner diameter of shift washer 128. Boss 115, shoulder 109 and/or shift washer 128 may optionally include knurling or other friction enhancers or mechanical interlocks at the interface between these components as are known in the art to reduce relative rotation between shift washer 128 and shank 116. Expander 112 abuts shank 116 on threaded portion 117 of core bolt 114. Shank 116 and expander 112 are rotationally restrained together by key 113a positioned in key receptacle 113b. In alternative embodiments, other methods known to those skilled in the art may be used to rotationally restrain shank 116 and expander 112 together over core bolt 114.

Recesses 119 in spacer 118 serve to center thrust washer 121 and shift washer 128 over bore 131. Boss 115 serves to center bolt 114 in the middle of shift washer 128. Similarly, thrust washer 121 centers bolt 114. Thrust washer 121, shift washer 128 and boss 115 in combination serve to center bolt 114 in the middle of bore 131. Such centering serves to ensure shoulder 109 is aligned with shear segment 129 and bore 131 to permit passage of shank 116 though bore 131 as described herein. It has been found that accurately aligning shank 116, shift washer 128 and bore 131 decreases variances in the force required to separate shear segment 129 from shift washer 128 as described below.

As assembled as shown in FIGS. 13A, 13B and 13C, clamp 110 may include some amount of preload to hold the individual components of clamp 110 together and to permit friction to prevent relative rotation of some components. For example, it my be beneficial for shank 116, shift washer 128 and spacer 118 to be held together so that it will be possible to secure shank 116 from revolving by restraining wrenching flats 140.

Bore 131 through spacer 118 may optionally include longitudinal knurling or other irregularities to reduce rotation of shank 116 as it progress through spacer 118 as described below.

Referring to FIGS. 14A and 14B, clamp 110 is illustrated partially installed through work pieces 130a and 130b. Work piece 130a includes aperture 131a and front side aperture rim 132a while work piece 130b includes aperture 131b and blind side aperture rim 132b.

As illustrated in FIGS. 14A and 14B, clamp 110 includes bulbed expander 112'. Bulbing expander 112 into bulbed expander 112' is the first stage of installation of clamp 110. After inserting clamp 110 through aperture 131a and 131b, expander 112 is bulbed to form bulb expander 112' by restraining wrenching flats 140 while rotating wrenching portion 108 to revolve core bolt 114 and threaded portion 117 with respect to shank 116 and expander 112. As expander 112 advances along threaded portion 117, shank 116 restrains the top portion of expander 112 while the bottom portion of expander 112 continues to advance along threaded portion 117 of core bolt 114. This exerts a compression force on expander 112, causing expander 112 to deform into bulbed expander 112' including flange 111. In one embodiment, flange 111 extends substantially perpendicular to the axis of shank 116 and the remaining portions of expander 112 forming a substantial flange to engage blind side aperture rim 132b with substantially uniform pressure. Similarly, in one embodiment, shift washer 128 provides uniform clamping force against front side aperture rim 132a. In the illustrated embodiment, shift washer 128 is substantially flat, however, other embodiments are contemplated wherein shift washer 128 is whatever shape is required to uniformly engage front side aperture rim 132a. In alternative embodiments, additional washers or other structures/supports may be located on or around shank 116 and adjacent to shift washer 128 to permit the use of clamp 110 with irregular geometries, such as countersunk apertures (not illustrated).

FIGS. 14A and 14B, illustrated expander 112 fully bulbed with shift washer 128 intact and shear segment 129 attached to shift washer 128. This permits flange 111 and bulb expander 112' to be substantially fully formed prior to drawing work pieces 130a and 130b together. Further tightening of shaft 114 as illustrated in FIG. 14b results in shear segment 129 separating from shift washer 28 permitting shank 116 to advance into spacer 118 as shown in the following figures. Accordingly, in the illustrated embodiment, the compressive/torsion forces required to bulb expander 112 are less than the force required to fracture shear segment 129 from shear washer 128 or first weakened region 124 or second weakened region 126.

FIGS. 15A and 15B illustrate shank 116 partially advanced into spacer 118 with shear segment 129 separated from shift washer 128' and positioned above shank 116. FIGS. 15a and 15b illustrate clamp 110 prior to drawing work pieces 130a and 130b together but after shear segment 129 has separated from shift washer 128'.

Referring now to FIGS. 16A and 16B, clamp 110 is illustrated fully installed with work pieces 130a and 130b clamped together with flange 111 abutting blind side aperture rim 132b and shear segment 128' abutting front side aperture rim 132a. Shank 116 and shear segment 129 fill the majority of the length 118D of spacer 118. Also, first weakened region 124 on bolt head 107 has fractured, separating bolt head 107 into top portion 107a and bottom portion 107b, with bottom portion 107b continuing to abut and restrain thrust washer 121.

Referring to FIGS. 17A and 17B, clamp 110 is illustrated in the process of being removed from work pieces 130a and 130b. Specifically, weakened region 126 has fractured due to continued rotation of core bolt 114 from the position illustrated in FIGS. 16A and 16B such that second weakened region 126 has failed separating core bolt 114 from threaded portion 117. As illustrated, expander 112' is connected to threaded portion 117 and available for removal from the blind side of work piece 130b while the remaining portions of core bolt 114, shank 116, thrust washer 121, spacer 118, shear segment 129 and shift washer 128' are available for removal from the front side of work piece 130a.

As should be apparent from the above description of FIGS. 13-17, the failure point of four different components needs to be controlled so that installation occurs as described. First, expander 112 should substantially fully bulb prior to any other component fracturing. Next, shear segment 129 should shear off shift washer 128 prior to the first or second weakened regions 124 and 126 failing. Next, first weakened regions 124 should fracture prior to second weakened region 126, allowing top portion 107a to be removed, indicating clamp 110 is installed. Finally, second weakened region 126 fractures, severing the internal connections clamping work pieces 130a and 130b together and permitting the removal of the various components of claim 110 from work pieces 130a and 130b.

Figure 18:
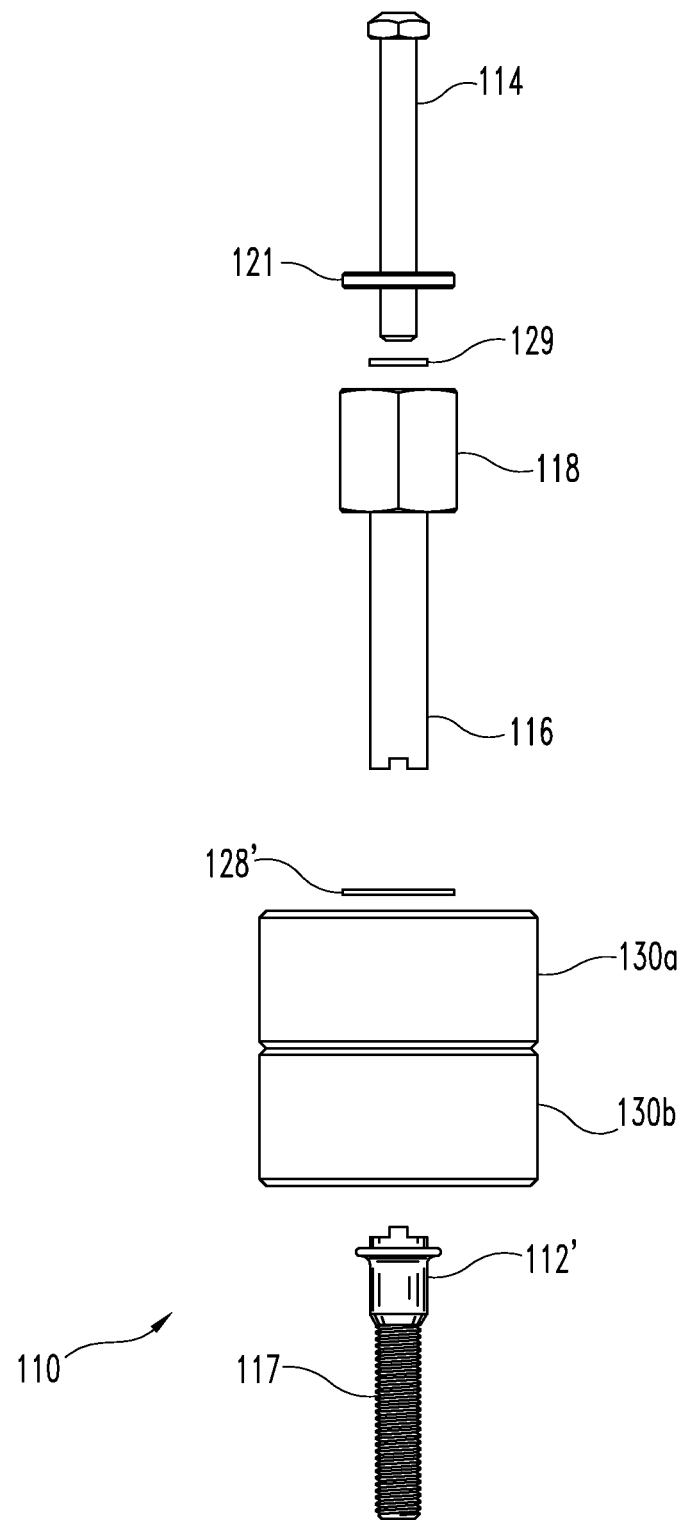
FIG. 18 illustrates an exploded view of several components of one embodiment of the clamp of FIGS. 13A and 13B after removal from the work piece.

Referring now to FIG. 18, several of the components of clamp 110 are illustrated after removal from work piece 130a and 130b including core bolt 114, thrust washer 121, shear segment 129, spacer 118 including shank 116, shift washer 128', bulbed expander 112' and threaded portion 117.

Figure 19:
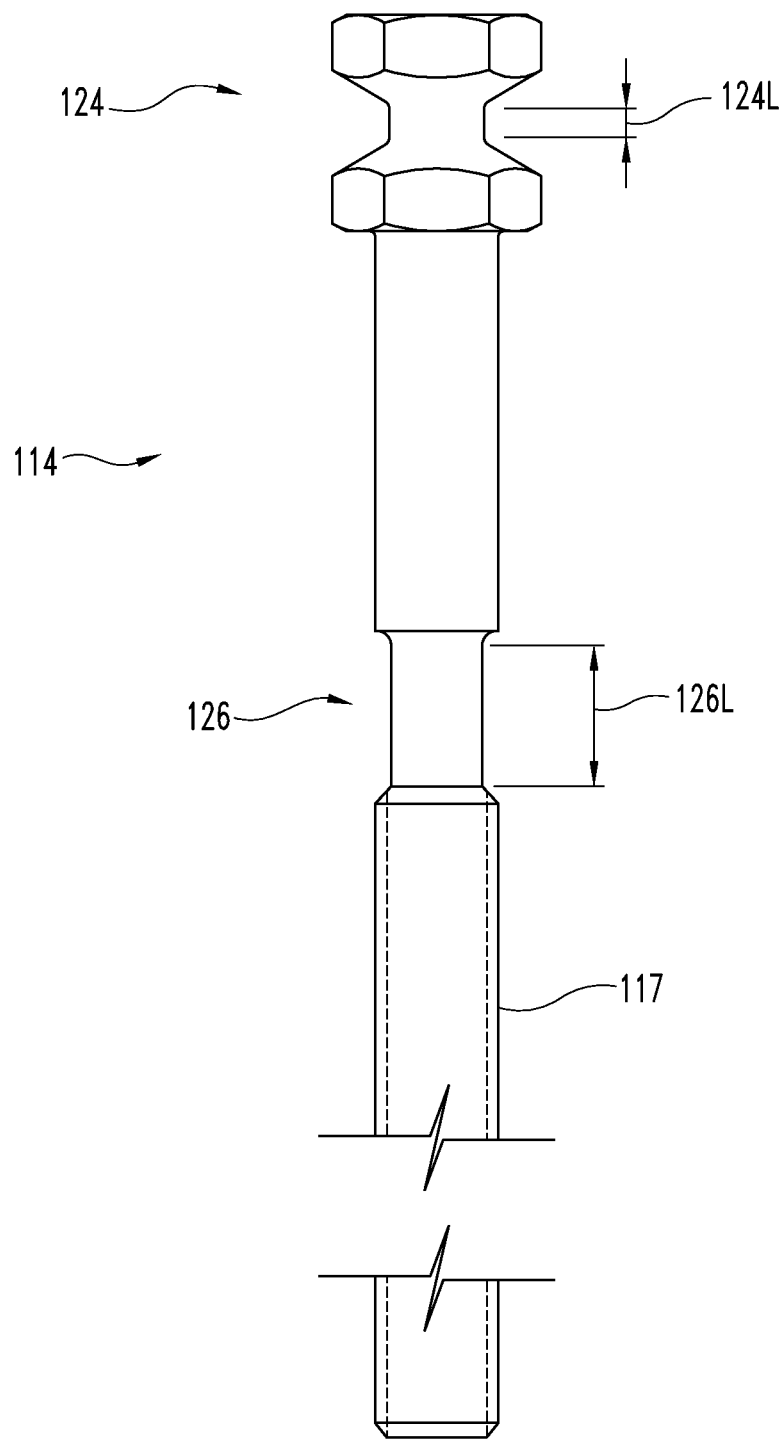
FIG. 19 illustrates a side elevational view one embodiment of a bolt component of a clamp as described herein.

Referring to FIG. 19, one embodiment of core bolt 114 is illustrated in greater detail, in particular, first weakened region 124 is shown having length 124L representing the linear length of the narrowed diameter of first weakened region 124. Similarly, second weakened region 126 is illustrated having a length 126L representing the length of the portion having a narrowed diameter in second weakened region 126. These embodiment may reduce the amount of energy released when first and second weakened regions 124 and 126 fracture as compared to other embodiments disclosed utilizing notched break grooves.

In this regard, in some applications it may be undesirable to release a substantial amount of energy when fracturing threaded portion 117 from the rest of core bolt 114. Such energy could be release in the form of kinetic energy imparted to the various components of clamp 110. While portions located on the front side of work piece 130a are likely restrained by the tool used to fracture clamp 110, no similar structure would restrain the portions located on the blind side of work piece 130b. It is possible for components such as threaded portion 117 and bulbed expander 112' to be ejected from aperture 131b with sufficient velocity to damage other components that may be located in their path.

Conversely, a brittle type fracture of first weakened region 124 may be desirable to generate a distinct failure indicator with fewer rotations of bolt head 108. And many embodiments will have a tool engaged with top portion 107a when first weakened region 124 is fractured that could absorb any imparted kinetic energy, potentially mitigating top portion 107a as a projectile.

The particular embodiment selected for a particular bolt 114 or 14 depends upon the particular application and material used for bolt 114 or 14. Providing a longer narrowed diameter, such as 124L or 126L, may increase the amount of plastic deformation that occurs prior to fracture and may shift the fracture from a brittle type rapid fracture to a ductile type tear with reduced energy release during the tear. One consequence of using weakened regions such as 124 or 126 as compared to break grooves 24 or 26 is a greater number of rotations of bolt 114 or 14 could be required to complete the desired fracture.

In yet other embodiments, a notch type weakened region could be utilized having a radius sufficient to reduce or eliminate any notch type stress concentration factors (not illustrated). In any event, desirable performance characteristic can be achieved in the first and second weakened regions 124 and 126 by balancing bolt material with geometry considerations of the first and second weakened regions 124 and 126, including, but not limited to, minimum diameter, notch effects, length 124L and/or 126L, and/or other stress concentrators or stress relievers.

Figure 20:
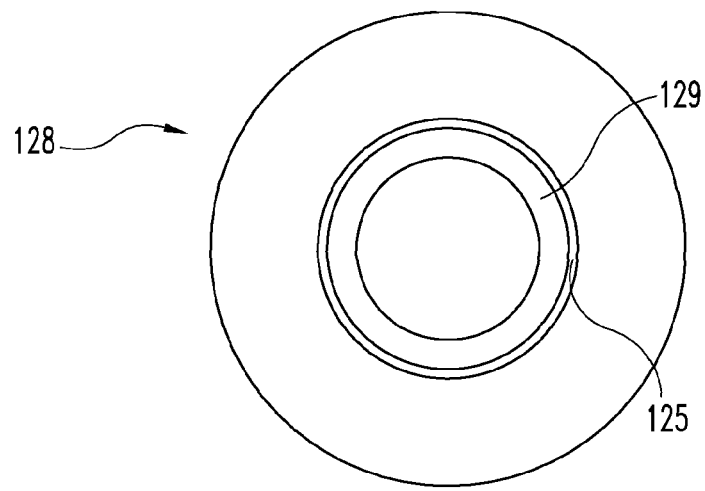
FIG. 20 illustrates a top plan view of a shift washer component of a clamp described herein.
Figure 21:
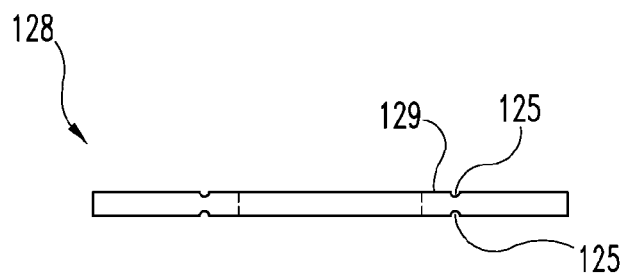
FIG. 21 illustrates a side elevational view of the shift washer illustrated in FIG. 20.

Referring to FIGS. 20 and 21, one embodiment of shift washer 128 is illustrated including weakened region 125. As illustrated in FIGS. 20 and 21, weakened region 125 is a narrow depression on both the top and bottom of shift washer 128 narrowing the effective thickness of shift washer 128 and also defining shear segment 129. As shown in FIG. 21, the surface of shift washer 128 may be coplanar across the narrow depression defined by weakened region 125. In one embodiment, weakened region 125 may be machined into top and bottom or either the top or the bottom of shear segment 128. In another embodiment, weakened region 125 may be formed by a cold working stamp or embossing operation on the top and/or bottom of shift washer 128. In one embodiment, weakened region 125 is positioned approximately at the outer diameter of shank 116 to permit shank 116 to pass through shift washer 128 after separation of shear segment 129.

With further regard to shift washer 128, it should be understood that weakened regions 125 are optional. It is possible to control the force required to remove shear segment 129 from shift washer 128 by other means such as thickness control. However, weakened region(s) 125 provide one means to artificially modify the strength of stock material that may have varying shear properties. For example, an operator could control the size and/or depth and/or number of weakened region(s) to tailor a stock material to desired shear strength.

Figure 22:
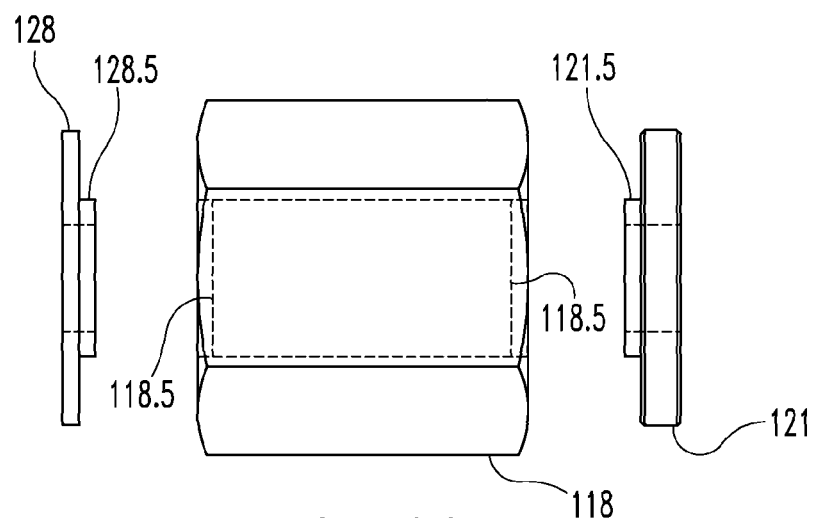
FIG. 22 illustrates an exploded view of an alternative embodiment of the shift washer, thrust washer and spacer components used in one embodiment of a clamp described herein.

Referring now to FIG. 22, alternate embodiments of shift washer 128, spacer 118 and thrust washer 121 are illustrated. In particular, shift washer 128 includes flange 128.5 while thrust washer 121 includes flange 121.5. In the illustrated embodiment, flanges 128.5 and 121.5 are approximately the same dimension and each are sized to fit in recesses 118.5 located on the top and bottom of spacer 118. The embodiment illustrated at FIG. 22 permits spacer 118 to be installed in either direction, potentially reducing assembly error.

Figure 23:
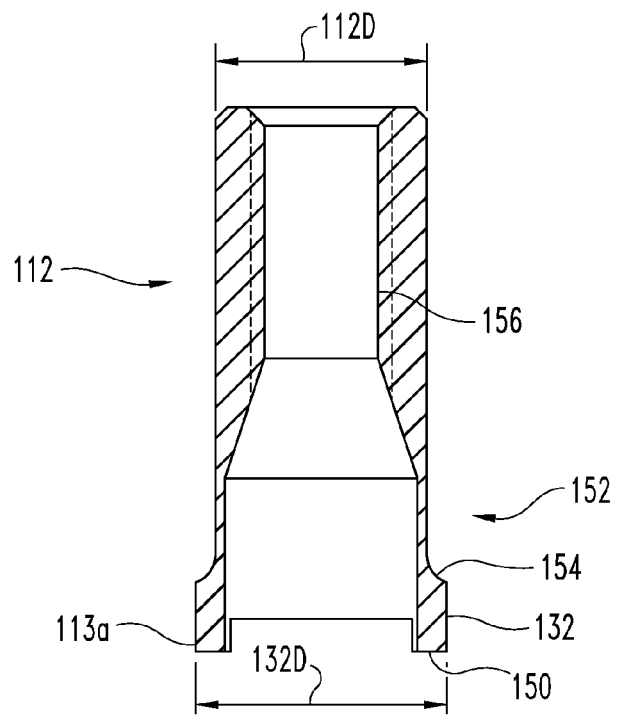
FIG. 23 illustrates a cross-sectional view of an uncrimped expander component of a clamp described herein.
Figure 24:
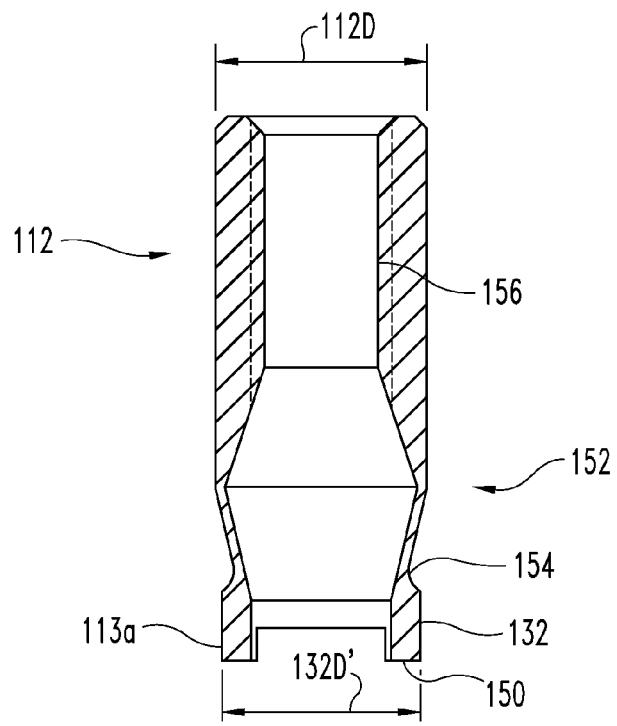
FIG. 24 illustrates a cross-sectional view of an crimped expander component of a clamp described herein.

Referring now to FIGS. 23 and 24, an embodiment of expander 112 is illustrated. In FIG. 23, expander 112 is illustrated before any crimping or swaged as discussed above with regard to expander 12. As illustrated, expander 112 includes threaded portion 156, thin-walled bulbing region 152, transition 154, flanged end 132, leading edge 153 and key 113a. As shown in FIG. 23, diameter 132D of flanged end 132 is greater than diameter 112D of expander 112 prior to being crimped or swaged as described above. In the illustrated embodiment, leading edge 150 and flange end 132 have sufficient wall thickness to resist buckling due to compressive loads described above.

Referring to FIG. 24, expander 112 is illustrated after flange end 132 has been crimped or swaged to reduce diameter 152D' of flanged end 132 to either equal to or less than diameter 112D of expander 112. As illustrated in FIG. 24, thin-walled bulbed region 152 is predisposed to buckle on sufficient compressive load between region 132 and threaded portion 156. Of note, transition 154 is located inside of the outer diameter 152D' of flanged end 132 such that the radiused transition formed when thin-walled bulbed region 152 buckles while creating flange 111 during the bulbing of expander 112 will not directly impact or contact blind side aperture rim 132b because such the radiused transition is located inside of aperture 131b.

Figure 25:
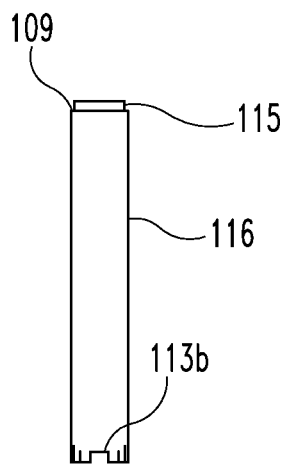
FIG. 25 illustrates a side elevational view of a shank used in an embodiment of a clamp described herein.

Referring to FIG. 25, an embodiment of shank 116 is illustrated including boss 115, shoulder 109 and key receptacle 113b. For reference, in the illustrated embodiment, boss 115 extends from the inner diameter of shank 116 and has a wall thickness approximately one-third the wall thickness of shank 116. As describe above, boss 115 abuts the inside of shift washer 128 and serves to help center shank 116 over bore 131 of spacer 118.

As should be apparent from the above descriptions, clamp 110 can be installed (and removed) using similar tools described above for use with clamp 10, including manual and automatic processes.

Also as described above with regard to clamp 10, the pre-bulbed geometry of expander 112' helps ensure that blind side aperture rim 132b does not become rounded or otherwise damaged during clamping. The pre-bulbed geometry can spread clamping forces evenly over a relatively large area to avoid damaging work piece 130b.

Also, clamp 110 retains the overall cylindrical and smooth shape exhibited by clamp 10, allowing the use of clamp 110 in may applications where other known rivets and clamps are not suitable such as when adhesives may extrude into apertures 130a and 130b.

It should be understood that "wrenching portions" and "wrenching flats," as used herein, are intended to accommodate any known surface that can be used to engage a manual or automatic tool, including a cylindrical surface engageable by a one-way clutch or roller clutch. The clamps 10 and 110 disclosed herein can be used in both manual and automated applications. Use of cylindrical surfaces instead of wrenching flats makes it easier to use clamps 10 and 110 with automated installation robots. Conversely, in manual applications, human operators are adapt at adjusting parts as required to fit geometric wrenches, and geometric wrench apparatus are generally less expensive than one-way clutches. So other applications lend themselves to the use of conventional wrenching surfaces.

In one embodiment, the following materials are used for components of clamp 110. Shank 116 is made from 7075-T6 Aluminum (Al) Alloy. Shear Washer 128 is made from 6061-T6 Al Alloy. Spacer 118 is made from 2024-T4 or 7075-T6 Al Alloy. Expander 112 is made from one-quarter hard (17% cold reduced) austenitic stainless steel, such as AISI 304, or spheriodized annealed steel, such as AISI 8740. Core bolt 114 is made from 4130 steel, heat treated to 40-44 on the Rockwell C scale. The preceding embodiment is provided by way of example only. Other materials may be substituted as desired to obtain varying performance from clamp 110. In one embodiment, clamp 10 utilizes the same materials for corresponding components.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

What is claimed is:

1. A blind clamp comprising:
   a core bolt comprising a first threaded portion on a first end and a bolt head on a second end;
   an expanding nut comprising a second threaded portion, a end portion and a bulbing region between said second threaded and end portions of said expanding nut, wherein said bulbing region bulbs to form a flange upon application of a first compressive load between said second threaded portion and said end portion of said expanding nut and wherein said second threaded portion is threadingly engaged with said first threaded portion;
   a shank positioned between said expanding nut and said bolt head;
   a shear member that prevents said shank from advancing along said core bolt until a second compressive load is exerted, wherein said second compressive load is greater than said first compressive load and wherein said shear member is constructed and arranged to fracture and form a shear segment upon application of the second compressive load; and
   a boss on the shank constructed and arranged to interface with said shear member to align said shear member with respect to said shank, wherein said boss extends inside of the smallest internal dimension of said shear member before application of the first compressive load.

2. The clamp of claim 1, further comprising:
a spacer that defines a bore, wherein the bore is adapted to allow said shank to advance through said bore and said spacer.

3. The clamp of claim 2, further comprising:
a first weakened region on said bolt head that fractures said bolt head into a top portion and a bottom portion upon application of a third load to said bolt head, wherein said third load is greater than said second compressive load.

4. The blind clamp of claim 2, wherein said spacer further comprises a recess constructed and arranged to align said shear member with respect to said spacer.

5. The clamp of claim 2, wherein said boss extends into said bore before application of the first compressive load.

6. The blind clamp of claim 1, wherein said boss extends between said shear member and said core bolt.

7. The blind clamp of claim 1, wherein said boss has an axial cross-sectional area less than an axial cross-sectional area of the shank.

8. The blind clamp of claim 7, wherein said spacer further comprises a recess constructed and arranged to align said shear member with respect to said bore.

9. The blind clamp of claim 1, wherein said shear member is a shear washer.

10. A blind clamp comprising:
a core bolt comprising a first threaded portion on a first end and a bolt head on a second end;
an expanding nut comprising a second threaded portion, a end portion and a bulbing region between said second threaded and end portions of said expanding nut, wherein said bulbing region bulbs to form a flange upon application of a first compressive load between said second threaded portion and said end portion of said expanding nut and wherein said second threaded portion is threadingly engaged with said first threaded portion;
a shank positioned between said expanding nut and said bolt head;
a blocking member that prevents said shank from advancing along said core bolt until a second compressive load is exerted, wherein said second compressive load is greater than said first compressive load;
a first weakened region on said bolt head that fractures said bolt head into a top portion and a bottom portion upon application of a third load to said bolt head, wherein said third load is greater than said second compressive load; and
a second weakened region on said core bolt that fractures said core bolt and separates said first threaded portion from said bolt head upon application of a fourth load, wherein said fourth load is greater than said third load.

11. The blind clamp of claim 10, wherein said shank further comprised a boss constructed and arranged to interface with said shear member to align said shank and said shear member, wherein said boss extends inside the smallest internal dimension of said shear member.

12. A blind clamp comprising:
a core bolt comprising a first threaded portion on a first end and a bolt head including a bearing surface on a second end;
an expanding nut comprising a second threaded portion, a end portion and a bulbing region between said second threaded and end portions of said expanding nut, wherein said bulbing region bulbs to form a flange upon application of a first compressive load between said second threaded portion and said end portion of said expanding nut and wherein said second threaded portion is threadingly engaged with said first threaded portion and wherein said bearing surface on said head of said core bolt is on a lower surface of said head facing said expanding nut;
a shank positioned between said expanding nut and said bolt head;
a blocking member that prevents said shank from advancing along said core bolt until a second compressive load is exerted, wherein said second compressive load is greater than said first compressive load; and
a weakened region on said core bolt that fractures said core bolt and separates said expanding nut from said bolt head and said bearing surface upon application of a third load, wherein said third load is greater than said second compressive load.

13. The clamp of claim 12, wherein said blocking member is a shear washer.

14. The clamp of claim 13, wherein said shear washer comprises a third weakened region on said shear washer formed by a narrow depression on a surface said shear washer, wherein said surface of said shear washer is coplanar across said narrow depression.

15. The clamp of claim 12, further comprising a spacer adapted to allow said shank to advance through said spacer and a thrust washer adjacent and between said bolt head and said spacer.

16. The clamp of claim 12, further comprising a spacer adapted to allow said shank to advance through said spacer, wherein said spacer comprises a roughened internal bore to reduce rotation of said shank as said shank advances through said spacer.

17. The clamp of claim 12, wherein said expanding nut further comprises a transition between said end portion and said bulbing region, wherein said transition is located inside the outer diameter of said end portion such that the radiused transition formed when the bulbing region bulbs is inside the outer diameter of said end portion.

18. The clamp of claim 12, wherein said second threaded portion and said end portion do not substantially deform when said bulbing region bulbs to form the flange.

19. The clamp of claim 12, wherein said expanding nut, said shank and said spacer are substantially rotationally constrained together.

20. A blind clamp comprising:
a core bolt comprising a male threaded portion and a bolt head;
an expanding nut comprising a female threaded portion, a end portion and a bulbing portion between said female threaded portion and said end portion, wherein said bulbing portion bulbs to form a flange upon application of a first compressive load between the female threaded portion and the end portion, and wherein said female threaded portion is threadingly engaged with the male threaded portion;
a shank adjacent said expanding nut;
a spacer comprising a recess and a bore sized to permit said shank to advance through said spacer; and
a shear member that prevents said shank from advancing through said bore until a second compressive load is exerted between said shank and said spacer, wherein said second compressive load is greater than said first compressive load and wherein said recess is constructed and arranged to align said shear member with respect to said bore; and
a boss on said shank, wherein said boss is constructed and arranged to interface with said shear member to align said shank and said shear member and wherein said boss has an axial cross-sectional area less than an axial cross-sectional area of the shank;

wherein said expanding nut, said shank, and said spacer are substantially rotationally constrained together.

21. The blind clamp of claim 20, wherein said recess is constructed and arranged to conform to the shape of said shear member and wherein said shear member fits within said recess.

22. The blind clamp of claim 20, wherein said boss extends between the smallest internal dimension of said shear member and said core bolt.

23. The blind clamp of claim 20, wherein said shear member is a shear washer.

24. A blind clamp comprising:
- a core bolt comprising a first threaded portion on a first end and a bolt head on a second end;
- an expanding nut comprising a second threaded portion, a end wall portion and a bulbing region between said second threaded and end wall portions of said expanding nut, wherein said bulbing region bulbs to form a flange upon application of a first compressive load between said second threaded portion and said end wall portion of said expanding nut and wherein said second threaded portion is threadingly engaged with said first threaded portion;
- a shank positioned between said expanding nut and said bolt head; and
- a shear member that prevents said shank from advancing along said core bolt until a second compressive load is exerted, wherein said second compressive load is greater than said first compressive load, wherein an inner diameter of said shank is smaller than a smallest inner diameter of said shear member.

25. The clamp of claim 24, further comprising:
- a spacer adapted to allow said shank to advance through said spacer.

26. The clamp of claim 24, wherein said expanding nut further comprises a transition between said end wall portion and said bulbing region, wherein said transition is located inside the outer diameter of said end wall portion such that the radiused transition formed when the bulbing region bulbs is inside the outer diameter of said end wall portion.

27. The clamp of claim 24, further comprising a weakened region on said core bolt that fractures said core bolt and separates said expanding nut from said bolt head and said bearing surface upon application of a third load, wherein said third load is greater than said second compressive load.

28. The clamp of claim 24, wherein said shank and said shear member are separate parts.

* * * * *